United States Patent [19]
Palmgren et al.

[11] Patent Number: 5,837,088
[45] Date of Patent: Nov. 17, 1998

[54] RADIO FREQUENCY INDUCTION HEATABLE COMPOSITIONS

[75] Inventors: Charlotte M. Palmgren; Craig S. Chamberlain; Brian J. Fish, all of St. Paul, Minn.

[73] Assignee: Minnesota Mining and Manufacturing Company, St. Paul, Minn.

[21] Appl. No.: 452,320

[22] Filed: May 26, 1995

Related U.S. Application Data

[62] Division of Ser. No. 156,406, Nov. 19, 1993, abandoned, which is a continuation of Ser. No. 668,974, Mar. 13, 1991, abandoned.

[51] Int. Cl.$^6$ .............................. B32B 5/16; B05D 5/00
[52] U.S. Cl. .................. 156/272.4; 156/272.2; 156/306.6; 156/379.6
[58] Field of Search ................ 156/272.2, 273, 156/306.6, 379.6, 272.4

[56] References Cited

U.S. PATENT DOCUMENTS

| | | | |
|---|---|---|---|
| 3,360,466 | 12/1967 | Short | 252/62.53 |
| 3,461,014 | 8/1969 | James | 156/272 |
| 3,574,031 | 4/1971 | Heller, Jr. et al. | 156/273 |
| 4,146,403 | 3/1979 | Armanini et al. | 106/291 |
| 4,209,365 | 6/1980 | Ozaki et al. | 204/14 |
| 4,427,481 | 1/1984 | Smith et al. | 156/306.6 |
| 4,438,179 | 3/1984 | Solo | 428/407 |
| 4,509,988 | 4/1985 | Bernhard | 106/308 |
| 4,541,891 | 9/1985 | Leatherman | 156/379.6 |
| 4,618,525 | 10/1986 | Chamberlain et al. | 428/209 |
| 4,624,798 | 11/1986 | Gindrup et al. | 252/62.54 |
| 4,772,577 | 9/1988 | Rittler | 501/145 |
| 4,814,020 | 3/1989 | Kicser et al. | 106/499 |
| 4,816,364 | 3/1989 | Oishi | 430/108 |
| 4,977,053 | 12/1990 | Ohishi et al. | 430/106.6 |
| 5,294,763 | 3/1994 | Chamberlain et al. | 219/729 |

FOREIGN PATENT DOCUMENTS

| | | |
|---|---|---|
| 162 979 | 12/1985 | European Pat. Off. . |
| 0 195 859 | of 1986 | European Pat. Off. . |
| 195 859 | 10/1986 | European Pat. Off. . |
| 0 379 730 | 8/1990 | European Pat. Off. . |
| 1 554 780 | 1/1969 | France . |
| 62-86055 | 4/1987 | Japan . |
| 62-172080 | 7/1987 | Japan . |
| 63-46258 | 2/1988 | Japan . |
| 1 308 603 | 3/1970 | United Kingdom . |
| 1 212 186 | 11/1970 | United Kingdom . |
| 2 218 422 | 11/1989 | United Kingdom . |

*Primary Examiner*—Charles Nold
*Attorney, Agent, or Firm*—Gary L. Griswold; Walter N. Kirn; Roger R. Tamte

[57] ABSTRACT

A composition comprising: (1) a susceptor of magnetically coupled radio frequency energy comprising a non-magnetic particulate substrate, e.g., an electrically insulative material in particulate form, bearing a thin magnetic coating, e.g., a magnetic inorganic film, and (2) a matrix that is substantially non-reflective of radio frequency energy, e.g., silicone rubber, which matrix can be heated upon the composition's being subjected to magnetically coupled radio frequency energy. It has been discovered that thin magnetic coatings on non-magnetic particles provide energy transfer with induction heaters equal to or better than many commonly used solid susceptor particles. It has also been discovered that the temperature of the composition of this invention can be regulated so as not to exceed a predetermined temperature.

14 Claims, 1 Drawing Sheet

RADIO FREQUENCY INDUCTION HEATABLE COMPOSITIONS

This is a division of application Ser. No. 08/156,406, filed Nov. 19, 1993, abandoned which is a continuation of application Ser. No. 07/668,974, filed Mar. 13, 1991, now abandoned.

BACKGROUND OF THE INVENTION

1. Field of the Invention

This invention relates to articles capable of being heated by magnetically coupled radio frequency energy.

2. Discussion of the Art

Magnetic susceptors are used to convert energy derived from radio frequency induction heaters to heat energy at a point of application. For example, U.S. Pat. No. 3,461,014 discloses a method for heat sealing and bonding predetermined sealing areas of two units of material, one of which has a heat-fusible plastic surface, comprising the steps of (1) positioning a deposit of fine, discrete susceptor particles selected from the chemical family of ferromagnetic oxides on one of said units at said predetermined sealing areas, (2) bringing said units of materials into opposed, interfacing relation with said deposit interposed therebetween and contiguous to said fusible plastic surface, (3) subjecting said susceptor particles to a magnetic induction field and thereby concentrating heat effect upon substantially only the plastic material immediately contiguous to said particles, and (4) bringing said units into firm contact.

U.S. Pat. No. 3,574,031 discloses a method of heat welding thermoplastic bodies comprising the steps of (1) forming a stratum of susceptor sealant by uniformly dispersing particles of a susceptor material selected from a group consisting of magnetically polar substances and electrically polar substances, excitable by a selected form of indirectly applied energy for raising the temperature of the susceptor material in a thermoplastic carrier compatible with the chemical families of the thermoplastic bodies to be welded, each of said particles having a maximum dimension less than the thickness of the stratum; (2) applying the stratum of susceptor sealant to the bodies in the area to be heat welded; and (3) exposing the susceptor sealant to the selected form of indirectly applied energy to generate heat therein sufficient to soften the carrier and cause the stratum to intimately weld the thermoplastic bodies.

Bonding by induction heating can be used to seal bags and pouches, seal window panes, bind books, and the like.

Induction heating can be used in situations where microwave heating is not suitable, such as, for example, in cases where the materials to be bonded absorb microwave energy, such as polar polymers, wood, or materials containing non-magnetic conductive particles. In these situations, it may be desirable to heat the bond area only and not the material to be bonded.

SUMMARY OF THE INVENTION

This invention provides a composition comprising: (1) a susceptor of magnetically coupled radio frequency energy comprising a non-magnetic particulate substrate, e.g., an electrically insulative material in particulate form, bearing a thin magnetic coating, e.g., a magnetic inorganic film, and (2) a matrix that is substantially non-reflective of radio frequency energy, e.g., silicone rubber, which matrix can be heated upon the composition's being subjected to radio frequency energy.

Previously, magnetic susceptors that have been used as energy transfer agents with induction heaters have been in the form of solid particles. Surprisingly, it has been discovered that thin magnetic coatings on non-magnetic particles provide energy transfer with induction heaters equal to or better than many commonly used solid susceptor particles. Moreover, it has been discovered that the temperature of the composition of this invention can be regulated so as to not exceed a predetermined temperature, thereby minimizing decomposition of the matrix on account of overheating. Furthermore, the susceptors have high heating efficiencies, are of low weight, are of low cost, and are easily handlable.

DETAILED DESCRIPTION

Figure 1:
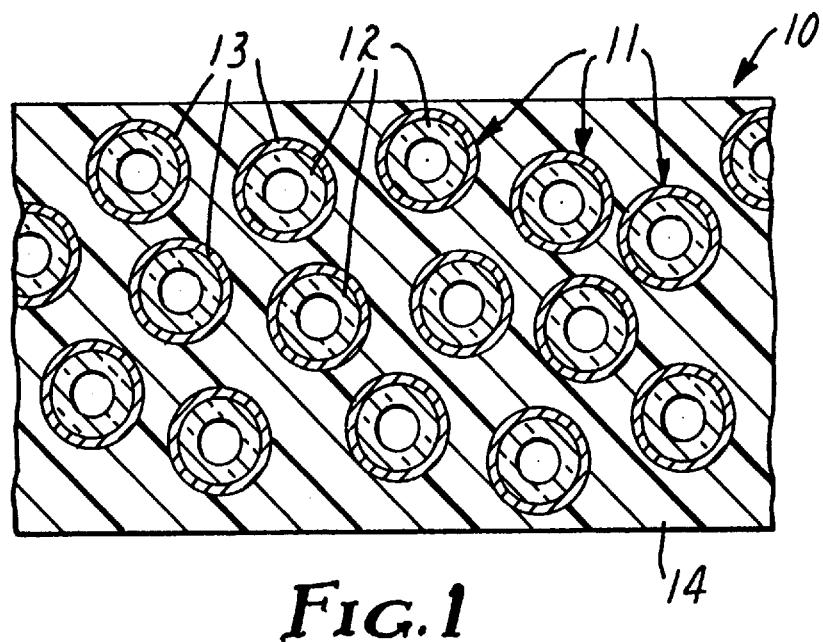
FIG. 1 shows a schematic view of a composition comprising a plurality of susceptors of magnetically coupled radio frequency energy disposed in a matrix substantially non-reflective of radio frequency energy.

In a preferred embodiment of this invention, as shown in FIG. 1, composition 10 comprises (1) susceptors 11 comprising a non-magnetic substrate 12, which is in particulate form, bearing a thin magnetic coating 13 thereon, and (2) a matrix 14 that is substantially non-reflective of radio frequency energy, which matrix can be heated upon the compositions being subjected to radio frequency energy.

Substrates can be made of such materials as glass, ceramic, polymer, or the like. It is preferred that the material of the substrate have sufficient strength to withstand processing conditions, such as, for example, compounding and extrusion. Preferably, the surface of the substrate is continuous, so as to be able to receive and support a coating of a thin, continuous, magnetic film. The shape of the substrate can vary. Examples of shapes that are useful for this invention include spherical, spheroidal, ellipsoidal, granular, acicular, plates, flakes, and shapes that are irregular and non-uniform from substrate to substrate. The particles forming the substrates can be solid or hollow. The dimensions of the substrate can vary, but it is preferred that the major dimension be smaller than one centimeter, more preferably from 10 to 1,000 micrometers.

The material for the coating for the substrate must be magnetic in nature, and it is preferable that the material have a large magnetic hysteresis loop. Inorganic materials suitable for preparing the magnetic coating include metals, such as iron, cobalt, and nickel, alloys thereof, such as stainless steel, amorphous metal alloys, and oxides of metals, such as ferrites. The coatings are preferably sufficiently thick to form a continuous coating and to impart magnetism to the coated particle. The thickness of the coating can range from about 10 to 10,000 Å, preferably, from about 10 to about 1,000 Å, and more preferably, from about 20 to about 500 Å. As a general rule, above a certain minimum thickness, as the thickness of the coating increases, the greater is the observed conversion of electromagnetic energy to heat.

The heating efficiency of the susceptor of this invention is dependent on the magnetic properties of the coating. As the temperature of the coating approaches its Curie temperature, its magnetic properties decrease so that the material is no longer magnetic. At the Curie temperature, the material can no longer efficiently absorb induction energy. When the material cools to a temperature below its Curie temperature, it becomes magnetic again and will absorb induction energy. Control of Curie temperature can be used to limit the maximum temperature of the material being heated. The relatively narrow maximum temperature range of the composition of this invention is surprising because thin coatings of magnetic materials generally have a broad Curie temperature range. By appropriate choice of the coating material, a wide variety of limiting temperatures can be obtained. Examples of materials that can be used to provide an appropriate Curie temperature include magnetic metals, such as iron, cobalt, or nickel, in combination with selected amounts of metals or metalloids, such as silicon, phosphorous, or boron.

Material to be heated by the susceptors of this invention, i.e., material forming the matrix, must be substantially non-reflective of radio frequency energy. These materials can be solids, including powders, liquids, or gases. In other words, the matrix can be flowable or non-flowable. The susceptors can be mixed with the matrix material or the matrix material can be coated with the magnetic susceptor material. The susceptors can also just be laid-up on the matrix material. Matrix material suitable for this invention include polymers, waxes, silicone rubbers, heat shrinkable rubbers, and hot-melt adhesives.

The susceptors of this invention have a number of advantages over susceptors of the prior art. The coated susceptors of this invention are lower in weight, are lower in cost because they contain less metal, are more easily dispersible in the matrix, and are more easily handled during processing than are susceptors previously known. Moreover, the susceptors of this invention have heating efficiencies equal to or better than susceptors made of solid particulate materials. The susceptors of this invention can be made more transparent to X-rays than susceptors made of solid metal powders.

It has been found that certain coated needle-shaped or flat non-metallic substrates, e.g., flakes, though solid, can have a lower weight than conventional solid metal particles. In addition, flat coated particles, such as coated mica flakes, provide heat more effectively than do coated spherical particles; accordingly, flakes can provide lower volume loadings than can spherical particles, but can still provide an equivalent or greater amount of heat.

The susceptors of this invention can be used in a number of different ways. For example, they can be incorporated into a matrix such as a thin polymeric sheet or a ceramic dish and the matrix heated by an induction heater; they can be added to a liquid polymeric material, and the material subsequently cured in an induction heater; they can be admixed with a hot-melt adhesive powder or hot-melt adhesive particles, and an induction heater can then be used to melt the composition and thereafter form an adhesive bond.

If coated microbubbles are used as susceptors in a matrix containing hot-melt adhesive powder, the microbubbles will impart light weight character to the composition to form a foamed adhesive or syntactic-foamed adhesive.

Hot-melt adhesives admixed with susceptors can be applied to an article by coating the mixture on the surface of an article to be bonded, as for example, the top of a box or the flap of a package. After the contents are inserted into the box or package, the filled container can be placed in an induction heater with the portion thereof to be sealed held in place during the heating process. A particularly useful aspect of this mixture involves the bonding of separate pieces or portions of thermoplastic polymeric material, such as, for example, the free ends of thermoplastic polymeric tubing.

Figure 2:
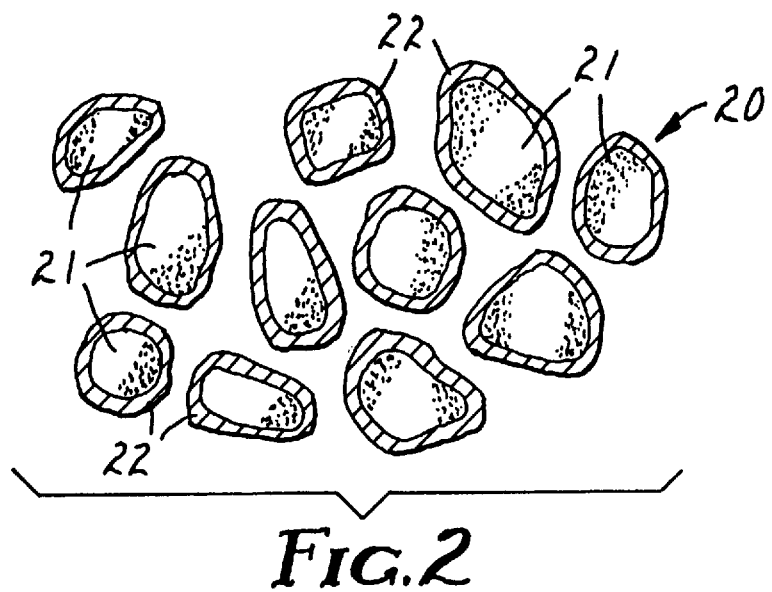
FIG. 2 shows a schematic view of a plurality of susceptors comprising particles of a hot melt adhesive bearing a coating of a magnetic material on the surface thereof.

In another aspect of this invention, as shown in FIG. 2, hot-melt adhesive particles themselves can be used as the substrate of the susceptor. The hot-melt adhesive particles 21 can be directly coated with the thin-film coating 22. When heated by an induction heater, the adhesive particles 20 melt, flow into contact with other adhesive particles, and then subsequently cool to form a solid adhesive mass. Because the volume of metal present is very small, almost 100% of the mass is adhesive. The cohesive strength will be close to that of a hot-melt adhesive containing no added particles. A hot-melt adhesive powder suitable for this purpose is designated by the trademark EASTOBOND FA300, available from Eastman Chemical Products, Kingsport, Tenn.

The heating efficiency of the composition can be controlled by controlling the percentage of susceptors in the composition, the thickness of the composition, or both. The susceptors are also capable of being re-heated.

Induction heatable susceptors complement microwave heatable susceptors. Coated susceptor particles that work well for one application do not necessarily work well for the other application. The coating of the coated particles must be magnetic to efficiently absorb induction heating energy, while non-magnetic coated particles work well as microwave susceptors. For induction heating, in general, the thicker the magnetic coating, the greater the energy absorption.

The following non-limiting examples serve to further illustrate the invention. The LEPEL T-2.5-1-MC-B3W induction heater used in the following examples was a 2.5 kilowatt unit having two frequency ranges, 2.5 to 5 MHz and 5 to 8 MHz. The coil dimensions, grid and tank circuit settings, and sample coupling determine the actual resonant frequency of the induction heater during operation. Full power was not normally used in the examples. The coil included 5 turns of ¼ in. outer diameter copper tubing. The inner diameter of the coil was 1.25 in. and the length of the coil was 1.75 in. The coil was cooled by water.

EXAMPLE 1

Glass microbubbles (760 g, S60/10000 SCOTCHLITE, Minnesota Mining and Manufacturing Company, St. Paul, Minn.) having an average density of 0.60 g/cc were tumbled in a vacuum chamber while being sputter coated with #304 stainless steel vapor. The stainless steel target was a rectangular cathode (12.7 cm by 20.3 cm). The argon sputtering gas pressure was 3 millitorr. The background pressure was 3 to $10 \times 10^{-6}$ millitorr. The operation was conducted for 420 minutes in the direct current planar magnetron mode at an applied power of 7.0 kilowatts.

The coated particles were dark silver-gray in color. Number 304 stainless steel is known to be non-magnetic, but when it is sputtered, it forms a magnetic thin film coating. The coating was estimated to be 75 Å thick by the method described in co-pending application U.S. Ser. No. 07/588,591.

The thickness of the coating on a spherical particle is calculated from the weight percent of the coating using the following equation:

$$t \approx 100 W/DS$$

where t represents the thickness of the coating in Angstroms,
W represents the weight percent of the coating on the particle, based on total weight of the particle,
D represents the density of the coating in g/cc, and
S represents the average surface area of the particles in $m^2/g$.

The value of W can be determined by dissolving the coating in a mixture comprising dilute hydrofluoric acid in combination with other acids, for example, nitric, sulfuric, and hydrochloric acids. The solution is then analyzed by the technique of Inductively Coupled Argon Plasma Atomic Emission spectroscopy, as described in M. Thompson and J. Walsh, *Handbook of Inductively Coupled Plasma Spectrometry*, Chapman and Hall, 1983.

The average surface area of the particles can be determined using the Brunauer, Emmett, Teller method (BET), as described in T. Allen, *Particle Size Measurement*, 3rd edition, Chapman and Hall, 1981.

A composition was made by mixing the coated particles (10 volume percent) with RTV-11 silicone rubber, available from GE Silicones, Waterford, N.Y. A strip of the composition, approximately ⅞ in.×2.5 in.×2.1 mm, was placed in the coil of the LEPEL T-2.5-1-MC-B3W induction heater. The frequency was set to the 5 to 8 MHz range, the plate current was set to 0.30 amp, and the grid current was set to 93 milliamps. A LUXTRON 750 thermometry system with fiber optic probes was used to measure the temperature of the sample in the coil as a function of time. Automatic data acquisition and software were used to obtain a heating rate for the sample. The heating rate of the composition was 14° C. per second.

EXAMPLE 2

The sample described in Example 1 was placed in the LEPEL induction heater set to the 2.5 to 5 MHz frequency range. The plate current was set to 0.79 amp, and the grid current was set to 230 milliamps. The heating rate of the composition was 13° C. per second.

EXAMPLE 3

The coated particles described in Example 1 were formed into a composition with RTV-11 silicone rubber at a volume loading of 5%. A ⅞ in.×2.5 in.×1.7 mm piece of this composition was placed in the LEPEL induction heater set to the 5 to 8 MHz range. The heating rate of the composition was 7° C. per second.

EXAMPLE 4

Glass microbubbles (85 g, SCOTCHLITE S60/10000) were coated with #304 steel by the process described in Example 1, except that the duration of the coating process was 300 minutes. The thickness of the coating was 225 Å. These coated microbubbles were made into a composition with RTV-11 silicone rubber at a 5% volume loading, and a ⅞ in.×2.5 in.×1.8 mm piece thereof was placed in the LEPEL induction heater set to the 5 to 8 MHz range. The heating rate of the composition was 12° C. per second.

EXAMPLE 5

Mica flakes (540 g, SUZORITE 200HK, Suzorite Mica, Inc., Hunt Valley, Md.), having an average density of 2.9 g/cc, were coated with #304 steel by the process described in Example 1, except that the duration of the coating process was 1080 minutes. The thickness of the coating was 105 Å. These coated flakes were made into a composition with RTV-11 silicone rubber at a volume loading of 5%. A ⅞ in.×2.5 in.×1.2 mm piece of this sample was placed in the LEPEL induction heater set to the 5 to 8 MHz range. The heating rate of the composition was 53° C. per second.

EXAMPLE 6

Nickel was coated onto glass microbubbles (9 g C15/250, SCOTCHLITE, Minnesota Mining and Manufacturing Company) having an average density of 0.15 g/cc by tumbling in a vacuum chamber with a source of nickel (TRIMAG, available from L. M. Simard, Santa Barbara, Calif.). The operating conditions included a plasma current of 6 to 10 amps, a cathode potential of 750 to 1125 volts, and a cathode current of 0.22 to 0.33 amp. The thickness of the coating was 51 Å. These particles were mixed into two-part 5 minute epoxy (DEVCON, Devcon Corp., Danvers, Md.) at a volume loading of 57%. A 2.0 in.×0.94 in.×0.94 mm piece of this sample was placed in the LEPEL induction heater set at the 5 to 8 MHz range. The heating rate of the composition was 13° C. per second.

EXAMPLE 7

Glass microbubbles (85 g, S60/1000 SCOTCHLITE) were coated with #304 steel by the process described in Example 1, except that the duration of the coating process was 180 minutes and the applied power was 0.8 kw. The thickness of the coating was 20 Å. Half of this sample was then given an overcoat of aluminum suboxide in the same manner as the sputtering process of Example 1 except that an aluminum target was run at an applied power of 1.5 kw for a period of 180 minutes while oxygen was added to the chamber at a rate of 5 cc/min. The thus-formed insulating overcoat had the result of eliminating the bulk conductivity of the coated particles. Each of these samples were made into a composition with 5 minute epoxy (SCOTCHCAST, Minnesota Mining and Manufacturing Company) at a volume loading of 50%. A 1.0 in.×1.0 in.×1.8 mm piece of both of these samples was placed in the LEPEL induction heater set at the 5 to 8 MHz range. For the sample wherein the particles were coated with steel only, the heating rate was 9.2° C./sec. For the sample wherein the particles were coated with both aluminum suboxide and steel coatings, the heating rate was 9.3° C./sec. It was concluded that the insulating overcoat did not affect the heating rate of the composition.

EXAMPLE 8

The nickel-coated particles of Example 6 were mixed into a plaster of Paris matrix at a loading of 10% by weight. Sufficient water was added to the matrix to facilitate mixing. The composition was shaped into a cylindrical sample (1 in. in diameter; ¾ in. long) and allowed to dry overnight at 170° C. A Luxtron temperature probe was inserted into a small hole in the center of this sample. The sample was then placed in the LEPEL induction heater and heated under the conditions set forth in Table 1. In each case, the final temperature of the composition was between 331° C. and 345° C., thereby indicating that heating of the sample is limited by the Curie temperature of the metal coating.

Thin film coatings exhibit a broad Curie transition range, the magnetic susceptibility beginning to decrease at a temperature well below the Curie temperature. This accounts for the differences between the sample temperatures and the Curie temperature of bulk nickel metal, which is 354° C.

TABLE 1

| Frequency range (MHz) | Plate current (amp) | Average heating rate (°C./sec) | Final temperature (°C.) |
| --- | --- | --- | --- |
| 2.5 to 5 | .50 | 9 | 331 |
| 2.5 to 5 | .80 | 14 | 340 |

TABLE 1-continued

| Frequency range (MHz) | Plate current (amp) | Average heating rate (°C./sec) | Final temperature (°C.) |
|---|---|---|---|
| 5 to 8 | .22 | 11 | 338 |
| 5 to 8 | .30 | 12 | 345 |

EXAMPLE 9

Mica (540 g, SUZORITE 200HK) was coated with #304 steel by the process described in Example 1. The coating duration was 422 minutes at a power of 7 kw. The thickness of the coating was 35 Å. These particles were mixed into powdered high density polyethylene (GM9255 HOSTALEN HDPE, Hoechst Celanese Corp., Pasadena, Tex.) at a volume loading of 15%. The mixed powders were hot pressed to form a sheet having a thickness of about 0.6 mm. Pieces of this sheet were cut into strips.

Pieces of two sizes of standard polyethylene tubing were selected; the smaller size tubing had an outer diameter of ⅜ in., and the larger size tubing had an inner diameter of ⅜ in., such that the larger size tubing fit over the smaller size tubing. A ⅜ in. wide strip of the coated particle/polyethylene composition was wrapped around a piece of the smaller tube near one end of it. The larger tubing was stretched and fit over this end, thereby providing two pieces of tubing joined by a strip of composition containing coated particles and polyethylene wrapped around the interface. The assembly was put into the coil of the LEPEL induction heater as described in Example 1 for 10 seconds. The composition was heated by the induction heater to its melting temperature. The induction heating also melted the polyethylene tubing at the interface, providing a melt bonding of the two pieces of polyethylene tubing.

EXAMPLE 10

Adhesive particles (112 g, EASTOBOND FA300 Hot Melt Adhesive Powder, Eastman Chemical Products, Kingsport, Tenn.) having an average density of 1.25 g/cc were coated in the same manner as described in Example 1, except that the coating time was 310 minutes and the applied power was 0.5 kw. The thickness of the steel coating was 67 Å. A composition was made by mixing 47 volume percent of the coated particles into two part five-minute epoxy (DEVCON). A strip of the composition, approximately ⅞ in.×2.0 in.×2.0 mm, was placed in the LEPEL induction heater which had been set to the 5 to 8 MHz range and the heating rate was found to be 1.8° C. per second. Uncoated adhesive particles, mixed into five minute epoxy as described above, did not heat at all in the induction heater.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Method of heating a composition, comprising the steps of:
    (a) providing the composition comprising (a) a susceptor having the capability of absorbing radio frequency magnetic energy, said susceptor comprising a non-magnetic particle bearing a magnetic coating capable of absorbing magnetically coupled radio frequency energy; and (b) a matrix substantially non-reflective of radio frequency energy; and
    (b) subjecting said composition to magnetically coupled radio frequency energy.

2. The method of claim 1, wherein said coating absorbs less magnetically coupled radio frequency energy as the temperature of said coating increases.

3. The method of claim 1, wherein the magnetic susceptibility of said magnetic coating changes as the temperature of said coating changes.

4. The method of claim 3, wherein the magnetic susceptibility of said magnetic coating decreases as the temperature of said coating increases.

5. The method of claim 1, wherein said matrix is a heatable resin.

6. Method of bonding two surfaces comprising the steps of:
    (1) providing said two surfaces;
    (2) providing a composition comprising (a) a susceptor having the capability of absorbing radio frequency magnetic energy, said susceptor comprising a non-magnetic particle bearing a magnetic coating capable of absorbing magnetically coupled radio frequency energy; and (b) a matrix substantially non-reflective of radio frequency energy, wherein said matrix is a heatable resin and disposing said composition such that both of said two surfaces are in contact with said composition;
    (3) heating said composition by means of a source of magnetically coupled radio frequency energy;
    (4) removing said source of magnetically coupled radio frequency energy; and
    (5) allowing said composition to cool, whereby a bond is formed between said surfaces.

7. Method of bonding two surfaces comprising the steps of:
    (1) providing said two surfaces;
    (2) providing a composition comprising (a) a susceptor having the capability of absorbing radio frequency magnetic energy, said susceptor comprising a non-magnetic hot melt adhesive particle bearing a magnetic coating capable of absorbing magnetically coupled radio frequency energy; and (b) a matrix substantially non-reflective of radio frequency energy and disposing said composition such that both of said two surfaces are in contact with said composition;
    (3) heating said composition by means of a source of magnetically coupled radio frequency energy;
    (4) removing said source of magnetically coupled radio frequency energy; and
    (5) allowing said composition to cool, whereby a bond is formed between said surfaces.

8. Method of bonding two surfaces made of thermoplastic polymeric material comprising the step of:
    (1) providing said two surfaces;
    (2) providing composition comprising (a) a susceptor having the capability of absorbing radio frequency magnetic energy, said susceptor comprising a non-magnetic particle bearing a magnetic coating capable of absorbing magnetically coupled radio frequency energy; and (b) a matrix substantially non-reflective of radio frequency energy; and disposing said composition such that both of said two surfaces are in contact with said composition;
    (3) heating said composition by means of a source of magnetically coupled radio frequency energy sufficiently such that the heated composition melts said thermoplastic polymeric surfaces;

(4) removing said source of magnetically coupled radio frequency energy; and (5) allowing said composition to cool, whereby said thermoplastic polymeric surfaces become fused together.

9. The method of claim 8, wherein the matrix of said composition comprises a hot-melt adhesive.

10. The method of claim 8, wherein said non-magnetic particle of said susceptor of said composition comprises a hot-melt adhesive.

11. The method of claim 1, wherein said magnetic coating comprises a metal or metal alloy.

12. The method of claim 6, wherein said magnetic coating comprises a metal or metal alloy.

13. The method of claim 7, wherein said magnetic coating comprises a metal or metal alloy.

14. The method of claim 8, wherein said magnetic coating comprises a metal or metal alloy.

* * * * *